United States Patent
Ryu et al.

(10) Patent No.: US 10,143,986 B2
(45) Date of Patent: Dec. 4, 2018

(54) FLUIDIZED BED SYSTEM HAVING SPARGER CAPABLE OF MINIMIZING BLOCKAGE BY SOLIDS AND CONTROLLING METHOD THEREOF

(71) Applicant: KOREA INSTITUTE OF ENERGY RESEARCH, Daejeon (KR)

(72) Inventors: Ho-Jung Ryu, Daejeon (KR); Dal-hee Bae, Sejong-si (KR); Sung-ho Jo, Daejeon (KR); Seung-yong Lee, Daejeon (KR); Chang-keun Yi, Daejeon (KR); Gyoung-tae Jin, Daejeon (KR); Do-won Shun, Daejeon (KR); Jae-hyeon Park, Daejeon (KR); Young Cheol Park, Daejeon (KR); Jong-ho Moon, Daejeon (KR); Hyo Jin Lee, Daejeon (KR); Do Yeon Lee, Seoul (KR); Dong-ho Lee, Daejeon (KR); Jeom In Baek, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 0 days.

(21) Appl. No.: 15/689,526

(22) Filed: Aug. 29, 2017

(65) Prior Publication Data
US 2018/0272304 A1 Sep. 27, 2018

(30) Foreign Application Priority Data
Mar. 27, 2017 (KR) .................. 10-2017-0038361

(51) Int. Cl.
*B01J 8/18* (2006.01)
*B01J 4/00* (2006.01)

(52) U.S. Cl.
CPC .............. *B01J 8/1818* (2013.01); *B01J 4/004* (2013.01); *B01J 8/1809* (2013.01)

(58) Field of Classification Search
CPC ........ B01J 8/1818; B01J 4/004; B01J 8/1809; B01D 24/4631; B01D 24/14;
(Continued)

(56) References Cited

U.S. PATENT DOCUMENTS

| | | | | |
|---|---|---|---|---|
| 5,426,932 A | * | 6/1995 | Morihara | F01K 23/062 60/39.182 |
| 5,547,549 A | * | 8/1996 | Fraas | C10B 49/16 110/249 |
| 6,065,224 A | * | 5/2000 | Eigner | C05F 17/0247 34/135 |

(Continued)

FOREIGN PATENT DOCUMENTS

| CA | 2683947 A1 * | 10/2008 | ............... B03B 4/06 |
|---|---|---|---|
| JP | 6-30612 U | 4/1994 | |

(Continued)

*Primary Examiner* — Stephen M Gravini
(74) *Attorney, Agent, or Firm* — Birch, Stewart, Kolasch & Birch, LLP

(57) ABSTRACT

The present invention relates to a fluidized bed system having a sparger capable of minimizing a blockage by solids and controlling method thereof. And, more specifically, the present invention relates to a fluidized bed system having a sparger capable of minimizing a blockage by solids comprising a fluidized bed reactor to store a solid layer with a certain height and to fluidize the solid layer by using fluidization gases; a sparger having a pipe shape submerged in the solid layer and having a plurality of gas-discharging holes to spray fluidization gases onto the solid layer; and a gas-supplying line having its one end contacting a gas-supplying source and the other end connected to the sparger, wherein fluidization gases are introduced through the gas-supplying line into the sparger by driving the gas-supplying source, the fluidization gases are sprayed through the gas-discharging holes onto the solid layer, the gas-supplying source is placed higher than the sparger and the height difference ($H_g$) between the gas-supplying source and the sparger is greater than the height of the solid layer.

14 Claims, 5 Drawing Sheets

(58) Field of Classification Search
CPC .............................. B01D 24/4689; B01D 24/24; B01D 24/4636; B01D 24/36; C02F 2303/16
USPC .......................................................... 34/565
See application file for complete search history.

(56) References Cited

U.S. PATENT DOCUMENTS

| | | | | |
|---|---|---|---|---|
| 6,249,988 B1 * | 6/2001 | Duske | ................... | F26B 11/028 122/422 |
| 6,298,579 B1 * | 10/2001 | Ichitani | ..................... | B03B 4/00 209/154 |
| 6,755,892 B2 * | 6/2004 | Nalette | .................. | A62B 11/00 95/11 |
| 6,880,263 B2 * | 4/2005 | Gasparini | ............. | F26B 17/122 34/171 |
| 7,730,633 B2 * | 6/2010 | Jurkovich | .............. | A23K 40/00 34/381 |
| 7,987,613 B2 * | 8/2011 | Ness | ......................... | C10L 9/08 110/249 |
| 8,117,764 B2 * | 2/2012 | Ness | ......................... | C10L 9/08 110/346 |
| 8,372,185 B2 * | 2/2013 | Bullinger | .................. | B03B 4/06 209/133 |
| 8,869,420 B1 * | 10/2014 | Nazhad | ................... | F26B 21/08 110/342 |
| 9,518,779 B2 * | 12/2016 | Favaro | ...................... | A24B 3/04 |
| 9,638,414 B2 * | 5/2017 | Johnson | ................ | F26B 23/028 |
| 9,733,015 B2 * | 8/2017 | Onose | ..................... | F26B 21/10 |
| 2017/0044014 A1 * | 2/2017 | Ryu | .......................... | C01B 3/56 |
| 2017/0268768 A1 * | 9/2017 | Ryu | ......................... | F23C 10/18 |

FOREIGN PATENT DOCUMENTS

| | | | | |
|---|---|---|---|---|
| JP | | 7-174330 A | 7/1995 | |
| JP | | 11-248109 A | 9/1999 | |
| KR | | 10-1468556 B1 | 12/2014 | |
| WO | WO 2008127709 A2 * | | 10/2008 | ............... B03B 4/06 |

* cited by examiner

Fluidization gas

FLUIDIZED BED SYSTEM HAVING SPARGER CAPABLE OF MINIMIZING BLOCKAGE BY SOLIDS AND CONTROLLING METHOD THEREOF

BACKGROUND OF THE INVENTION

Field of the Invention

The present invention relates to a fluidized bed system having a sparger capable of minimizing a blockage by solids and controlling method thereof.

Background of the Related Art

In general, gas-solid fluidized bed (hereinafter referred to as fluidized bed) systems have the structure in which a gas distributor 1 is installed in a gas-solid fluidized bed system to divide the space inside the system into the upper part and the lower part, to inject gases into the lower part of the space, to evenly distribute the gases by means of the gas distributor 1 and to allow powders to flow into the upper part of the space. The lower part of the space, under the gas distributor 1, is called a gas-introducing chamber (plenum, 2) or a wind box.

In such systems, a fluidized state is created by evenly injecting an adequate amount of fluidization gases through a gas distributor 1 into a container filled with solids.

FIG. 2 is a graph to show a fluidized bed flow regime and changes in pressure drop (the difference in pressure) of a solid layer, depending on flow velocity of fluidization gases. As shown in FIG. 2, in the case of low flow velocity, gases simply flow in the space between solid particles without causing movements of the solid particles.

The particle layer in this state is referred to as a fixed bed. Then, the pressure drop in the solid layer increases until it becomes identical with the weight of the solid layer, as the flow velocity of the gases increases. When the pressure drop becomes identical with the weight of the solid layer, a drag force exerted against the solids becomes identical to a gravitational force, and then the solids shake and start to move.

Such a state is called minimum fluidization condition, and gas superficial velocity, at this time, is called minimum fluidization velocity ($U_{mf}$).

When the flow velocity continues to rise afterwards, the pressure drop remains nearly constant, but the solids are expanded so that the solids are separated from each other and move. Then, the solid layer, as a whole, starts to show such characteristics as liquids have. Excessive gases, left after fluidizing such a solid layer, pass through the layer in the form of a large gas void, and this is referred to as bubbles, a term similar to the one used in gas-liquid junctions. Flow velocity at which bubbles are created for the first time is called minimum bubbling velocity, and the layer showing such a phenomenon is called a bubbling fluidized bed.

Meanwhile, in the case of the use of the gas distributor 1 shown in FIG. 1, if fluidization gases are not injected, or if pressure in a fluidized layer is higher than that in a plenum, 2, solid particles fall through the holes configured on the gas distributor 1, and the particles are piled in the plenum, 2, thereby preventing normal gas supplies.

A variety of patents and utility patents presenting methods of preventing solids from falling through a gas distributor 1 are registered (Korean Patent Publication No. 10-2002-0008998, Korean Patent Publication No. 10-2013-0015683, Korean Patent Publication No. 10-2013-0015684, 20-2001-003143).

FIG. 3 is a diagram of a fluidized bed reactor 10 using a sparger 20 to inject gases. FIG. 4A is a partial magnifying view of the sparger 20, and FIGS. 4B and 4C are sectional views of the sparger 20. As shown in FIG. 3, the sparger 20 can be used in another way of preventing solids from falling through a gas distributor 1.

In FIG. 3, fluidization gases are injected through the sparger 20, and as shown in FIG. 4A, one end of the sparger 20 is closed. Fluidization gases are injected into the other end of the sparger and then discharged through the gas-discharging holes 21 made on the sparger 20.

The number and size of the gas-discharging holes 21 made on the sparger 20 are determined in a similar way that the number and size of the gas-discharging holes on a traditional fluidized bed distributor 1 are determined. FIGS. 4B and 4C are sectional views of the sparger 20. As shown in FIG. 4B, gas-discharging holes can be placed horizontally on both sides or, as shown in FIG. 4C, downwards. The size and shape of a sparger 20, and the direction and shape of the gas-discharging holes 21 can be changed in whatever way according to designs.

In case the sparger 20 is placed as in FIG. 3, solids do not fall into the plenum, 2, compared to FIG. 1. This is because the distributor 1 is not used. On the other hand, the gas-discharging holes 21 of the sparger 20 are submerged in a solid layer, and therefore, solids can be piled inside the sparger 20 while gases are not being injected into the sparger 20.

Also, in case a gas-supplying source (compressors, blowers, and so on), connected at the end of a gas-supplying line 30 to inject fluidization gases, is placed, as in FIG. 5, lower than the solid layer of a fluidized bed, the gas-supplying line 30 is blocked due to the solid particles introduced into the gas-supplying line 30 as well as the sparger 20. As a result, in case solid particles are charged into the fluidized bed, in general, gases should be continuously injected to prevent a blockage in the sparger 20.

Meanwhile, even in the case of continuous injection of gases through a sparger 20, if pressure fluctuations happen in a fluidized bed, and if pressure in a fluidized bed is higher than that in a gas-supplying line 30, solids in the fluidized bed can be introduced into the sparger 20 and further into the gas-supplying line 30 to block the gas-supplying line 30.

PRIOR ART DOCUMENTS

Patent Documents (Patent Document 0001) Japanese Patent Laid-Open Publication No. H7-174330
(Patent Document 0002) Japanese Patent Laid-Open Publication No. H11-248109
(Patent Document 0003) Japanese Utility Patent Laid-Open Publication No. H06-30612
(Patent Document 0004) Korean Patent Publication No. 10-1468556

SUMMARY OF THE INVENTION

The present invention is devised to solve the traditional problems heretofore described, and according to an embodiment of the present invention, the present invention is directed to providing a fluidized bed reactor having a sparger capable of minimizing a blockage by solids and controlling method thereof by setting the height difference ($H_e$), between a gas-supplying source connected to a gas-supplying line and a sparger 20, larger than the total of the height of a solid layer ($H_S$) and the height ($H_P$) which is high enough to buffer maximum pressure fluctuations.

Also, according to an embodiment of the present invention, the present invention is directed to providing a fluidized bed reactor having a sparger capable of minimizing a blockage by solids and controlling method thereof, once gas injection through the sparger is stopped temporarily and then before the gas injection is resumed, first by injecting gases having flow velocity greater than or equal to minimum fluidization velocity through a subsidiary gas-injecting mouth installed in the vertical pipe of a gas-supplying line, by fluidizing the solids existing in the upper part of the subsidiary gas-injecting mouth, by minimizing frictional loss between the wall of the gas-supplying line and particles, by injecting gases by means of a gas-supplying source such as compressors, blowers, etc. and then, by effectively removing the particles filling the vertical pipe of the gas-supplying line.

Additionally, according to another embodiment of the present invention, the present invention is directed to providing a fluidized bed reactor having a sparger capable of minimizing a blockage by solids and controlling method thereof, by installing an ejector-type subsidiary gas-injecting mouth in the horizontal pipe in the lower part of the gas-supplying line to inject subsidiary gases and by easily removing the solids existing in the vertical pipe of the gas-supplying line by means of the vacuum suction effect of an ejector.

Meanwhile, desirable technical purposes achieved by the present invention are not limited to the above mentioned ones, and other technical purposes, not mentioned herein, can be clearly understood by one of ordinary skill in the art to which the present invention pertains by reference to the following descriptions.

The first purpose of the present invention can be achieved by a fluidized bed system having a sparger, capable of minimizing a blockage by solids, comprising: a fluidized bed reactor to store a solid layer with a certain height ($H_S$) inside of it and to fluidize the solid layer with fluidization gases injected; a sparger having a pipe shape submerged in the solid layer in the fluidized bed reactor and having a plurality of gas-discharging holes to spray fluidization gases onto the solid layer; and a gas-supplying line with its one end contacting a gas-supplying source and with the other end connected to the sparger, wherein fluidization gases flow through the gas-supplying line into the sparger and they are sprayed through the gas-discharging holes onto the solid layer by driving the gas-supplying source, wherein the gas-supplying source is placed higher than the sparger, wherein the height difference ($H_g$) between the gas-supplying source and the sparger is greater than the height of the solid layer ($H_S$).

Further, the height difference ($H_g$) is greater than the total of the height of the solid layer ($H_S$) and the height ($H_P$) which is high enough to buffer maximum pressure fluctuations that can happen in a fluidized bed.

Moreover, the height ($H_P$) which is high enough to buffer maximum pressure fluctuations is calculated by the following equation 1.

$$H_P = \frac{\Delta P_{MAX}}{(1 - \varepsilon_{mf})(\rho_s - \rho_g)} \frac{g_c}{g} \quad \text{[Equation 1]}$$

In the above described equation 1,
$H_P$ indicates the height which is high enough to buffer maximum pressure fluctuations; $\Delta P_{max}$ indicates maximum pressure fluctuations in a fluidized bed; $\varepsilon_{mf}$ indicates voidage of a solid layer in a minimum fluidized state; $\rho_s$ indicates density of solids; $\rho_g$ indicates density of gases; $g_c$ indicates the gravitational acceleration constant; g indicates gravitational acceleration.

Additionally, the gas-supplying line has a subsidiary gas-injecting mouth on its one side, and once the driving of the gas-supplying source is stopped and then before it is resumed, subsidiary gases are injected through the subsidiary gas-injecting mouth into the gas-supplying line by driving the subsidiary gas-supplying source.

Further, the gas-supplying line comprises a sparger-connecting horizontal pipe connected to the sparger, a supplying source-connecting horizontal pipe connected to the gas-supplying source and a vertical pipe connected between the sparger-connecting horizontal pipe and the supplying source-connecting horizontal pipe.

Moreover, the subsidiary gas-injecting mouth is provided in the vertical pipe, and a controller controls the subsidiary gas-supplying source to inject subsidiary gases having flow velocity greater than or equal to minimum fluidization velocity of solid particles.

And the subsidiary gas-injecting mouth is provide on one side of the sparger-connecting horizontal pipe and subsidiary gases are injected in the direction parallel to the length of the sparger-connecting horizontal pipe.

Also, the end of the subsidiary gas-injecting mouth is configured as an ejector, and the ejector is inserted into the sparger-connecting horizontal pipe.

The second purpose of the present invention according to a method of operating a fluidized bed system on the basis of the first purpose heretofore mentioned can be achieved by a method of operating a fluidized bed system having a sparger capable of minimizing a blockage by solids, comprising the steps of installing a pipe-shaped sparger having a plurality of gas-discharging holes on the solid layer in a fluidized bed reactor; connecting a gas-supplying source placed higher than the sparger with the sparger by means of a gas-supplying line; and introducing fluidization gases through the gas-supplying line into the sparger by driving the gas-supplying source and fluidizing the solid layer by spraying fluidization gases through the gas-discharging holes onto the solid layer, wherein the height difference ($H_g$) between the gas-supplying source and the sparger is greater than the total of the height of the solid layer ($H_S$) and the height which is high enough to buffer maximum pressure fluctuations that can happen in a fluidized bed.

And the third purpose of the present invention in a fluidized bed system according to the above described first purpose, in the method for stopping the driving of the gas-supplying source and then resuming it, can be achieved by the method of operating a fluidized bed system having a sparger, capable of minimizing a blockage by solids, comprising the steps of stopping the driving of the gas-supplying source; injecting subsidiary gases through the subsidiary gas-injecting mouth, provided on one side of a gas-supplying line, into the gas-supplying line by driving the subsidiary gas-supplying source before resuming the driving of the gas-supplying source; removing the solid particles filling the gas-supplying line by driving the gas-supplying source; and stopping the driving of the subsidiary gas-supplying source.

Also, the vertical pipe of the gas-supplying line is provided with the subsidiary gas-injecting mouth, a controller controls the subsidiary gas-supplying source to inject subsidiary gases having flow velocity greater than or equal to minimum fluidization velocity of solid particles, the solids existing in the upper part of the subsidiary gas-injecting mouth are fluidized, and then the controller exerts control to drive the gas-supplying source.

Further, the subsidiary injecting mouth is provided on one side of the sparger-connecting horizontal pipe of the gas-supplying line, and subsidiary gases are injected in the direction parallel to the length of the sparger-connecting horizontal pipe.

The end of the subsidiary gas-injecting mouth, an ejector, is inserted into the sparger-connecting horizontal pipe, and the solids existing in the vertical pipe are removed by injecting subsidiary gases through the ejector using the vacuum suction effect.

According to an embodiment of the present invention, solid particles are prevented from blocking the gas-supplying line and flowing into the sparger by setting the height difference ($H_g$), between the gas-supplying source connected to the gas-supplying line and the sparger, greater than the total of the height of a solid layer ($H_s$) and the height which is high enough to buffer maximum pressure fluctuations that can happen in a fluidized bed.

Also, according to an embodiment of the present invention, the particles filling the vertical pipe of the gas-supplying line can be effectively removed, once gas injection through the sparger is stopped and then it is resumed, by first injecting gases having flow velocity greater than or equal to minimum fluidization velocity through the subsidiary gas-injecting mouth installed in the vertical pipe of a gas-supplying line, by fluidizing the solids existing in the upper part of the subsidiary gas-injecting mouth, by minimizing frictional loss between the wall of the gas-supplying line and the particles and then, by injecting gases by means of a gas-supplying source such as compressors, blowers, and so on.

According to another embodiment of the present invention, the solids existing in the vertical pipe of the gas-supplying line can be easily removed by means of the vacuum suction effect of an ejector by installing an ejector-type subsidiary gas-injecting mouth in the horizontal pipe in the lower part of the gas-supplying line and by injecting subsidiary gases.

Meanwhile, desirable technical subjects achieved by the present invention are not limited to the above mentioned ones, and other technical subjects, not mentioned herein, can be clearly understood by one skilled in the art to which the present invention pertains by reference to the following descriptions.

BRIEF DESCRIPTION OF THE DRAWINGS

Since the following drawings attached in the present application illustrate a preferred embodiment of the present invention and are helpful for better understanding of technical ideas of the present invention along with the detailed description of the present invention, interpretation of the present invention shall not be limited only to the descriptions of the drawings.

DETAILED DESCRIPTION OF THE PREFERRED EMBODIMENT

Figure 1:
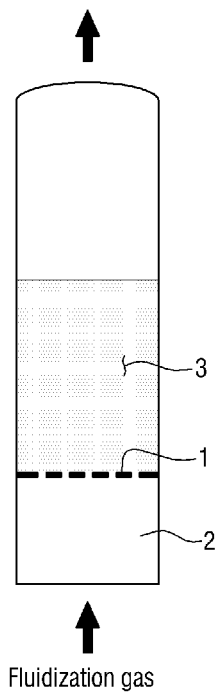
FIG. 1 is a diagram of a fluidized bed reactor having a traditional gas distributor.
Figure 2:
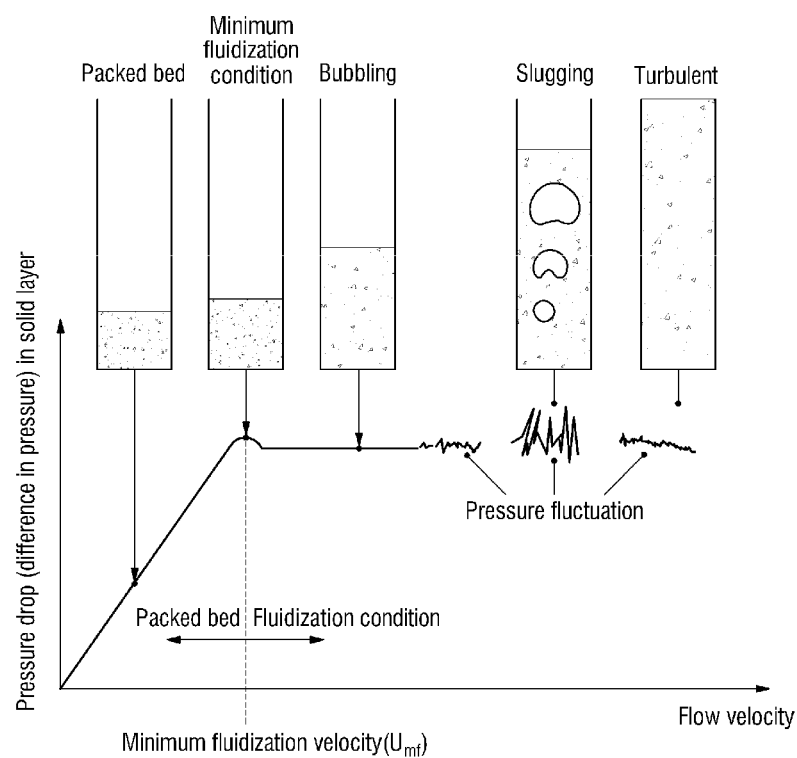
FIG. 2 is a graph to show a fluidized bed flow regime and changes in pressure drop (the difference in pressure) of a solid layer, depending on flow velocity of fluidization gases.
Figure 3:
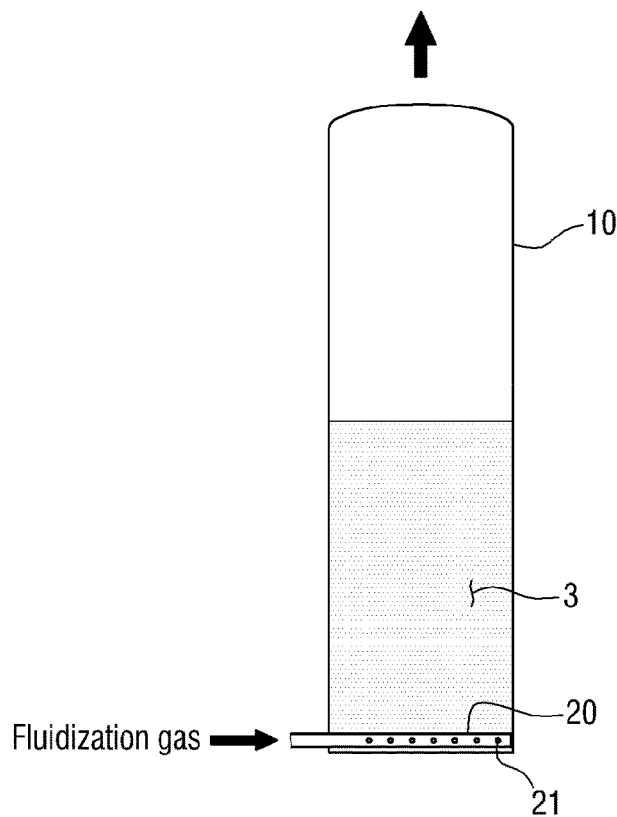
FIG. 3 is a diagram of a fluidized bed reactor using a traditional sparger to inject gases.
Figure 4A:
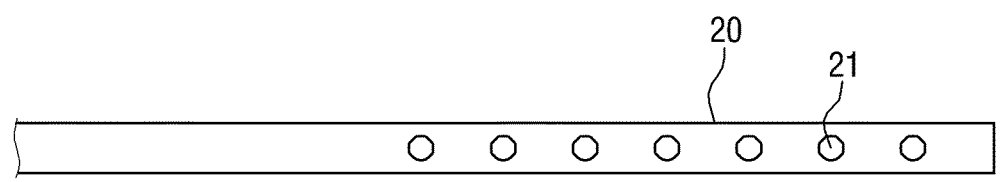
FIG. 4A is a partially enlarged view of a sparger.
Figure 4B:
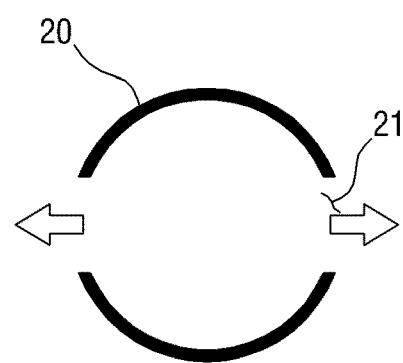
FIGS. 4B and 4C are sectional views of a sparger.
Figure 4C:
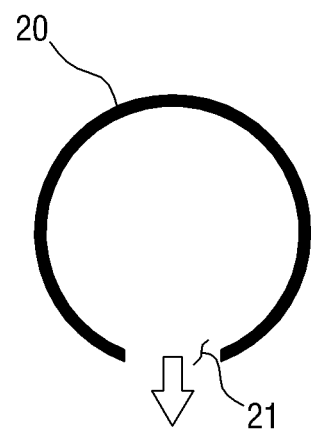
Figure 5:
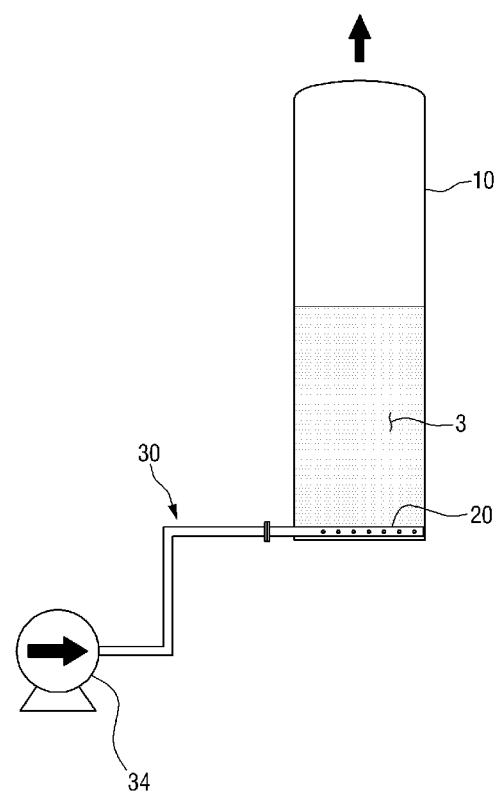
FIG. 5 is a diagram to show a fluidized bed reactor where a gas-supplying source (compressors or blowers), connected at the end of a traditional gas-supplying line to inject fluidization gases, is placed lower than the solid layer of a fluidized bed.

The above mentioned purposes, other purposes, features and advantages can be easily understood with the following preferred embodiments of the present invention related to the attached drawings. However, the present invention is not limited to the embodiments described herein and can be embodied in different forms. Instead, the embodiments described herein are provided to make the descriptions here thorough and perfect and to convey the idea of the present invention well enough to one skilled in the art.

In the present application, when it is mentioned that an element is deposited on another element, it means that the element can be directly formed on another element, or a third element can intervene between them. Also, in the drawings, the width of components is exaggerated for effective explanations.

The embodiments described in the present application can be explained by reference to sectional views and/or plan views, an ideal illustration of the present invention. In the drawings, the width of films and regions is exaggerated for effective explanations of technical subject matters. Accordingly, the form of illustrations can be changed according to manufacturing technologies and/or allowable errors, and so on. This means that the embodiments of the present invention are not limited to a certain form descried herein and includes possible changes in its form according to manufacturing processes. For example, regions showing right angles can be rounded and can take a form with designated curvature. As a result, the regions illustrated in the drawings have their own properties, and the shape of the regions is not to limit the scope of the invention, but to illustrate a certain form of the regions of elements. In various embodiments of the present invention, the terms 'first', 'second', etc. are used to describe various elements but those elements shall not be limited by such terms. Those terms are just used to distinguish an element from the other elements. The embodiments explained and illustrated herein include their complementary embodiments.

Terms in the present application are used to explain the embodiments but not to limit the present invention. In the present application, unless otherwise stated, the use of a singular noun includes the plural. The term "comprises" and/or "comprising" in the present application shall mean that stated elements does not exclude existence or addition of one or more other elements.

In the descriptions of the following specific embodiments, a variety of specific subjects are written to explain the invention in more detail and to be helpful for better understanding of the invention. However, any reader with enough knowledge of the art to understand the present invention can understand that the present invention can be used without such a variety of specific subjects. In advance, it is mentioned that in some cases, what is commonly known but not significantly related to the invention is not described in the descriptions of the present invention to prevent confusion caused for no special reason.

In the following description, the composition and function of a fluidized bed reactor 10 having a sparger 20 capable of minimizing a blockage by solids according to an embodiment of the present invention will be explained. First, FIG. 6 is a diagram of a fluidized bed system 100 having a sparger 20 capable of minimizing a blockage by solids according to an embodiment of the present invention.

Figure 6:
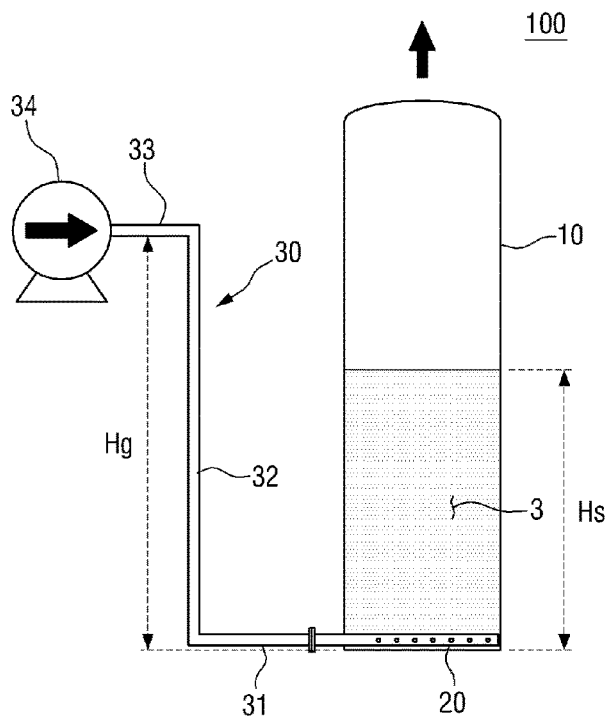
FIG. 6 is a diagram of a fluidized bed reactor having a sparger capable of minimizing a blockage by solids.

The fluidized bed system 100 having a sparger capable of minimizing a blockage by solids according to an embodiment of the present invention, as shown in FIG. 6, is configured to comprise a fluidized bed reactor 10, a sparger 20, a gas-supplying source 34, a gas-supplying line 30, and so on.

The fluidized bed reactor 10 is configured to store a solid layer with a certain height ($H_S$) inside of it, and such a solid layer is fluidized by fluidization gases injected by the sparger 20.

The sparger 20 having a pipe shape is submerged in the lower part of the solid layer inside the fluidized bed reactor 10 and has a plurality of gas-discharging holes 21 to spray fluidization gases onto the solid layer. The gas-discharging holes 21 can be configured on the bottom surface or on both sides respectively in a plural number and the number, shape, and location of the holes do not limit the scope of the right to the present invention.

The gas-supplying line 30 has its one end contacting the gas-supplying source 34 and the other end connected to the sparger 20. As shown in FIG. 6, the gas-supplying line 30 and the sparger 20 can be connected by a flange-type joint. Accordingly, fluidization gases are supplied through the gas-supplying line 30 to the sparger 20 by driving the gas-supplying source 34 and then sprayed through the gas-discharging holes 21 of the sparger 20 on solid layers, and the solid layers are fluidized.

The gas-supplying line 30, as shown in FIG. 6, is configured to comprise a supplying source-connecting horizontal pipe 33 horizontally connected to the gas-supplying source 34, a sparger-connecting horizontal pipe 31 horizontally connected with the sparger 20 and a vertical pipe 32 provided between the supplying source-connecting horizontal pipe 33 and the sparger-connecting horizontal pipe 31.

And as shown in FIG. 6, the gas-supplying source 34 is placed higher than the sparger 20, the height difference ($H_g$) between the gas-supplying source 34 and the sparger 20, i.e. the length of the vertical pipe 32, is set greater than the height of a solid layer ($H_S$). Therefore, solid particles are prevented from blocking the gas-supplying line 30 because they cannot reach up to the place higher than the height of the solid layer existing in a fluidized bed even if they flow backwards.

Also, such a height difference ($H_g$) is set greater than the total ($H_P$) of the height of a solid layer ($H_S$) and the height which is high enough to buffer maximum pressure fluctuations ($\Delta P_{max}$) that can happen in a fluidized bed ($H_g > H_S + H_P$). The height ($H_P$) which is high enough to buffer maximum pressure fluctuations can be calculated according to the following equation 1.

$$H_P = \frac{\Delta P_{MAX}}{(1 - \varepsilon_{mf})(\rho_s - \rho_g)} \frac{g_c}{g} \quad \text{[Equation 1]}$$

In the above described equation 1, $H_P$ indicates the height which is high enough to buffer maximum pressure fluctuations [m]; $\Delta P_{max}$ indicates maximum pressure fluctuations in a fluidized bed [Pa]; $\varepsilon_{mf}$ indicates voidage of a solid layer in a minimum fluidized state [-]; $\rho_s$ indicates density of solids [kg/m$^3$]; $\rho_g$ indicates density of gases [kg/m$^3$]; $g_c$ indicates the gravitational acceleration constant, 1 [(kgm)/(Ns$^2$)]; and g indicates gravitational acceleration, 9.8 [m/s$^2$].

Additionally, a controller to control the driving of the gas-supplying source 34 is comprised.

As a result, according to an embodiment of the present invention, solid particles are prevented from blocking the gas-supplying line 30 and flowing into the sparger 20 by setting the height difference ($H_g$), between the gas-supplying source 34 connected to the gas-supplying line 30 and the sparger 20, greater than the total of the height of a solid layer ($H_S$) and the height ($H_P$) which is high enough to buffer maximum pressure fluctuations that can happen in a fluidized bed.

Meanwhile, if gas injection through the sparger 20 is temporarily stopped, solid particles can reach up to the height ($H_P$) of a solid layer corresponding to the heights of a solid layer and maximum pressure fluctuations ($\Delta P_{max}$) in the gas-supplying line 30, and if gases are injected again through the gas-supplying source 34 such as compressors or blowers, gases may not be injected without enough pressures exerted due to frictional loss between the wall of the gas-supplying line 30 and the particles.

Figure 7:
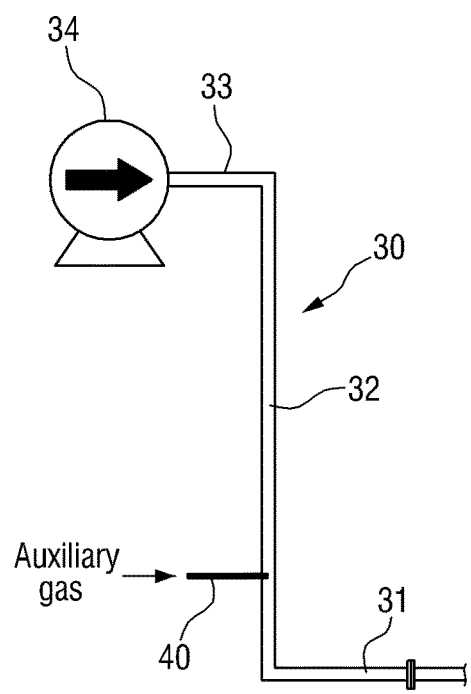
FIG. 7 is a diagram of a gas-supplying line having a vertical pipe connected to a subsidiary gas injecting line on its one side according to an embodiment of the present invention.

As shown in FIG. 7, minimizing frictional loss between the wall of the gas-supplying line 30 and the particles by fluidizing the particles filling the vertical pipe 32 of the gas-supplying line 30 can be a way to solve such a problem. This means the particles filling the vertical pipe of the gas-supplying line can be effectively removed, once gas injection through the sparger 20 is temporarily stopped and then before it is resumed, first by injecting gases having flow velocity greater than or equal to minimum fluidization velocity through a subsidiary gas-injecting mouth 40 installed in the gas-supplying line 30 as shown in FIG. 7, then by fluidizing the solids existing in the upper part of the subsidiary gas-injecting mouth 40 and injecting gases by means of the gas-supplying source 34. After gases are injected smoothly through the sparger 20, gas injection through the subsidiary gas-injecting mouth 40 may be stopped.

The subsidiary gas-injecting mouth 40 is provided on one side of the gas-supplying line according to an embodiment of the present invention, and once the driving of the gas-supplying source 34 is stopped and then before it is resumed, subsidiary gases are injected through the subsidiary gas-injecting mouth 40 into the gas-supplying line by driving the subsidiary gas-supplying source.

More specifically, the subsidiary gas-injecting mouth 40 is provided in the vertical pipe 32 and a controller controls the subsidiary gas-supplying source to inject subsidiary gases having flow velocity greater than or equal to minimum fluidized velocity of solid particles.

This means, in the fluidized bed system 100 according to an embodiment of the present invention, the way to resume the driving of the gas-supplying source 34 after the driving of the gas-supplying source is stopped is injecting subsidiary gases through the subsidiary gas-injecting mouth 40 provided in the vertical pipe 32 of the gas-supplying line into the gas-supplying line by driving the subsidiary gas-supplying source, once the driving of the subsidiary gas-supplying source 34 is stopped and then before it is resumed.

Then, the controller controls the subsidiary gas-supplying source to inject subsidiary gases having flow velocity greater than or equal to minimum fluidization velocity of solid particles, and the solids existing in the upper part of the subsidiary gas-injecting mouth 40 are fluidized, and then, the controller exerts control to drive the gas-supplying source 34. The solid particles filling the gas-supplying line can be removed effectively by driving the gas-supplying source 34 and frictional loss between the wall of the gas-supplying line and the particles can be minimized.

According to another embodiment of the present invention, the subsidiary gas-injecting mouth 40 is provided on one side of the sparger-connecting horizontal pipe 31 and is configure to inject subsidiary gases in the direction parallel to the length of the sparger-connecting horizontal pipe 31.

Figure 8A:
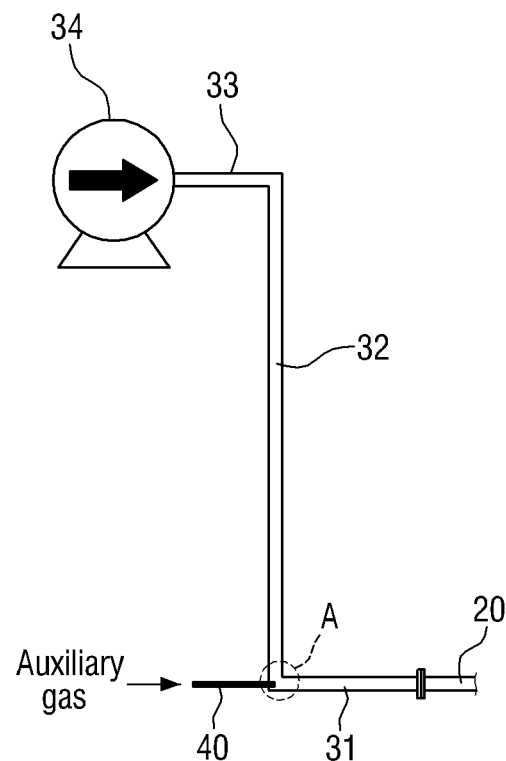
FIG. 8A is a diagram of a gas-supplying line having a horizontal pipe connected to an ejector-type subsidiary gas-injecting line according to an embodiment of the present invention.

FIG. 8A is a diagram of the gas-supplying line 30 where an ejector-type subsidiary gas-injecting mouth 40 is connected to the vertical pipe according to an embodiment of the present invention.

Figure 8B:
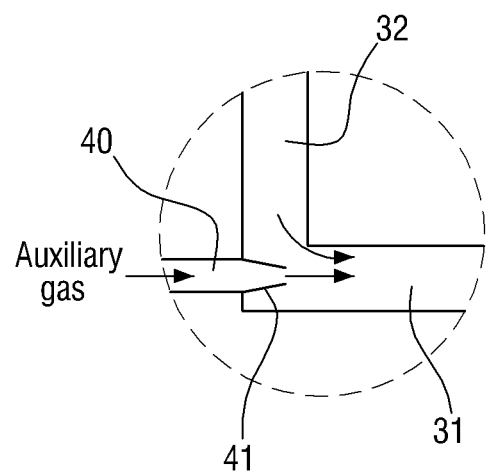
FIG. 8B is a partially enlarged view of part A of FIG. 8A.

As shown in FIGS. 8A and 8B, the end of the subsidiary gas-injecting mouth 40 consists of an ejector 41 and such an ejector 41 is inserted into a sparger-connecting horizontal pipe 31.

This means that the subsidiary gas-injecting mouth 40 is provided on one side of the sparge-connecting horizontal pipe 31 of the gas-supplying line 30, and that subsidiary gases are injected in the direction parallel to the length of the sparger-connecting horizontal pipe 31.

The end of the subsidiary gas-injecting mouth 40 consisting of an ejector 41 is inserted into the sparger-connecting horizontal pipe 31, subsidiary gases are injected through the ejector and the solids existing in the vertical pipe 32 are removed effectively by the ejector 41 having the vacuum suction effect.

Therefore, according to another embodiment of the present invention, the solids existing in the vertical pipe 32 of the gas-supplying line 30 are easily removed by means of the vacuum suction effect of an ejector, by installing an ejector-type subsidiary gas-injecting mouth 40 in the sparger-connecting horizontal pipe 31 and by injecting subsidiary gases.

Also, the above described device and method does not indicate that the composition and method of the above described embodiments are limitedly applied and each of the embodiments, in whole or in part, can be selectively coordinated to make various changes in its form.

PARTS LIST

1: Gas distributor
2: Gas-introducing chamber
3: Solid layer
10: Fluidized bed reactor
20: Sparger
21: Gas-discharging hole
30: Gas-supplying line
31: Sparger-connecting horizontal pipe
32: Vertical pipe
33: Supply source-connecting horizontal pipe
34: Gas-supplying source
40: Subsidiary gas-injecting mouth
41: Ejector
100: Fluidized bed system having a sparger capable of minimizing a blockage by solids

The invention claimed is:

1. A fluidized bed system having a sparger, the fluidized bed system having a sparger capable of minimizing a blockage by solids comprising:

a fluidized bed reactor to store a solid layer with a certain height ($H_s$) inside and to fluidize the solid layer via injected fluidization gases;

a sparger having a pipe shape submerged in the solid layer in the fluidized bed reactor and having a plurality of gas-discharging holes to spray fluidization gases onto the solid layer;

a gas-supplying line having one end contacting a gas-supplying source and an other end connected to the sparger;

wherein fluidization gases flow through the gas-supplying line into the sparger and are sprayed through the gas-discharging holes onto the solid layer, wherein the gas-supplying source is placed higher than the sparger and a height difference ($H_g$) between the gas-supplying source and the sparger is greater than the height of the solid layer ($H_s$).

2. The fluidized bed system having a sparger capable of minimizing a blockage by solids according to claim 1, wherein the height difference ($H_g$), is greater than a total of the height of the solid layer ($H_s$) and a height ($H_p$) which is high enough to buffer maximum pressure fluctuations that can happen in a fluidized bed.

3. The fluidized bed system having a sparger capable of minimizing a blockage by solids according to claim 2, wherein the height ($H_p$) which is high enough to buffer maximum pressure fluctuations is calculated by the following equation 1:

$$H_P = \frac{\Delta P_{MAX}}{(1-\varepsilon_{mf})(\rho_s - \rho_g)} \frac{g_c}{g} \quad \text{[Equation 1]}$$

in the above described equation 1, wherein $H_p$ indicates a height which is high enough to buffer maximum pressure fluctuations, $\Delta P_{max}$ indicates a maximum pressure fluctuation in a fluidized bed, $\varepsilon_{mf}$ indicates voidage of a solid layer in a minimum fluidized state, $\rho_s$ indicates density of solids, $\rho_g$ indicates density of gases, $g_c$ indicates the gravitational acceleration constant, and g indicates gravitational acceleration.

4. The fluidized bed system having a sparger capable of minimizing a blockage by solids according to claim 3, wherein the fluidized bed system having a sparger capable of minimizing a blockage by solids further comprises a controller to control driving of the gas-supplying source.

5. The fluidized bed system having a sparger capable of minimizing a blockage by solids according to claim 4, wherein a subsidiary gas-injecting mouth is configured on one side of the gas-supplying line and, once driving of the gas-supplying source is stopped and then before it is resumed, subsidiary gases are injected through the subsidiary gas-injecting mouth into the gas-supplying line by driving the gas-supplying source.

6. The fluidized bed system having a sparger capable of minimizing a blockage by solids according to claim 5, wherein the gas-supplying line comprises a sparger-connecting horizontal pipe connected to the sparger, a supplying-source-connecting horizontal pipe connected to the gas-supplying source and a vertical pipe connected between the sparger-connecting horizontal pipe and the supplying-source-connecting horizontal pipe.

7. The fluidized bed system having a sparger capable of minimizing a blockage by solids according to claim 6, wherein the subsidiary gas-injecting mouth is provided in the vertical pipe, and wherein the controller controls the subsidiary gas-supplying source to inject subsidiary gases having flow velocity greater than or equal to a minimum fluidization velocity of solid particles.

8. The fluidized bed system having a sparger capable of minimizing a blockage by solids according to claim 6, wherein the subsidiary gas-injecting mouth is provided on one side of the sparger-connecting horizontal pipe, and subsidiary gases are injected in a direction parallel to a length of the sparger-connecting horizontal pipe.

9. The fluidized bed system having a sparger capable of minimizing a blockage by solids according to claim 8, wherein an end of the subsidiary gas-injecting mouth consists of an ejector, and the ejector is inserted into the sparger-connecting horizontal pipe.

10. A method of operating the fluidized bed system according to claim 4, the method of operating the fluidized bed system having a sparger capable of minimizing a blockage by solids comprising the steps of installing a pipe-shaped sparger, having a plurality of gas-discharging holes, in the solid layer of a fluidized reactor; connecting a gas-supplying source installed higher than the sparger and the sparger through a gas-supplying line; introducing fluidization gases through the gas-supplying line into the sparger by driving the gas-supplying source, spraying the fluidization gases through the gas-discharging holes onto the solid layer, and fluidizing the solid layer, wherein the height difference ($H_g$) between the gas-supplying source and the sparger is greater than the total of the height of the solid layer ($H_s$) and the height ($H_p$) which is high enough to buffer maximum pressure fluctuations that can happen in a fluidized bed.

11. The fluidized bed system according to claim 5, in the method of resuming the driving of the gas-supplying source after the driving of the gas-supplying source is stopped, the method of operating the fluidized bed system having a sparger capable of minimizing a blockage by solids comprising the steps of sopping the driving of the gas-supplying source; injecting subsidiary gas through a subsidiary gas-injecting mouth provided on one side of the gas-supplying line by driving a subsidiary gas-supplying source before the driving of the gas-supplying source is resumed; removing solids filling she gas-supplying line by driving the gas-supplying source; and stopping the driving of the subsidiary gas-supplying source.

12. The method of operating the fluidized bed system having a sparger capable of minimizing a blockage by solids according to claim 11, wherein the subsidiary gas-injecting mouth is provided in the vertical pipe of the gas-supplying line, wherein a controller controls the subsidiary gas-supplying source to introduce subsidiary gases having flow velocity greater than or equal to minimum fluidization velocity of solid particles, wherein the solids existing in the upper part of the subsidiary gas-injecting mouth are fluidized and then, the controller exerts control to drive the gas-supplying source.

13. The method of operating the fluidized bed system having a sparger capable of minimizing a blockage by solids according to claim 11, wherein the subsidiary gas-injecting mouth is provided on one side of a sparger-connecting horizontal pipe of the gas-supplying line and subsidiary gases are injected in the direct parallel to the length of the sparger-connecting horizontal pipe.

14. The method of operating the fluidized bed system having a sparger capable of minimizing a blockage by solids according to claim 13, wherein the end of the subsidiary gas-injecting mouth consisting of an ejector is inserted into the sparger-connecting horizontal pipe, subsidiary gases are injected through the ejector and the solids existing in the vertical pipe are removed by the ejector having a vacuum suction effect.

* * * * *